Patented July 4, 1939

2,164,351

UNITED STATES PATENT OFFICE 2,164,351

PROCESSING OF MILK TO BE USED FOR BEVERAGES AND THE PRODUCT THEREOF

Herbert Stanley Samson, Winnipeg, Manitoba, Canada, assignor of two-fifths to John A. Dienner, Evanston, Ill.

No Drawing. Application August 19, 1937, Serial No. 159,928

9 Claims. (Cl. 99—55)

My invention relates to the art of dairy products, and more particularly is concerned with the art of preparing milk for beverages or other purposes, and with the product thereof, and the beverage which may be produced therefrom.

I employ the term "milk" not in the strict sense in which that term is considered as designating the sweet, clean lacteal fluid as it comes from the cow with nothing added or subtracted, but rather in the broad sense which includes the lacteal fluid as it comes from the cow with or without such additions or subtractions as do not change its essential character, and which includes any liquid product which is derived directly or indirectly from that lacteal fluid, or which is artificially produced, so long as it partakes of the characteristics of the lacteal fluid as it comes from the cow.

For a number of years, soda fountains, drug stores, restaurants, cafes, stores and others engaged in similar lines have dispensed a type of beverage variously known as "milk shake", "flip", "malted milk" and the like. The basic ingredients of these beverages or "drinks" are dairy products, such as milk, ice cream, malted milk powders, and various flavoring materials.

In the preparation of these beverages, the essential ingredients thereof are cooled, placed in a vessel called a shaker or mixer, and therein are agitated to a high degree, as, for example, by a high speed mechanical mixer.

Heretofore in the preparation of such beverages or drinks at the place where they are served, it has been necessary to add relatively large quantities of milk and ice cream to give the finished products the desired rich, creamy consistency, and a heavy texture, in order that the product be palatable and saleable. Even under ideal conditions, it has heretofore been difficult and sometimes impossible to whip these ingredients to the desired texture and increase of volume necessary for saleability. Heretofore it has not been possible by whipping of ordinary milk to form a relatively stable air-liquid emulsion under the conditions of temperature commonly prevailing at the place where drinks of this type are dispensed. Such air-liquid emusion as can be formed under these conditions is not only unstable, but no substantial increase in volume can be secured.

It is recognized that it is possible to form an air-liquid emulsion by whipping milk in its normal condition at or below certain critical temperatures. That temperature, however, lies below 40° F. Such air-liquid emulsions or phases are not stable when exposed to higher temperatures, rapidly decreasing in volume and returning to liquid milk upon a rise in temperature above the critical temperature. In other words, for all practical purposes, it has been impossible to whip milk except under very special circumstances.

It is also known that it is possible to freeze or semi-freeze a product having a composition similar to ice cream and to sell this as a frosted or frozen drink. The stability of the emulsion in that case is due entirely to freezing, and hence the emulsion can be maintained only in the frozen state.

The consumer usually desires certain flavoring ingredients, usually containing a large percentage of saccharides (sugars). These ingredients tend to depress the freezing point of the material with which they are used, and hence in the preparation of drinks as heretofore known have decreased the whipping properties of the ingredients and rendered the preparation of the drink less satisfactory. In other words, the flavoring ingredients which have been required have been a disadvantage in the preparation of the drinks as heretofore practiced.

The chief object of the present invention is to process milk in order to render it of greater utility in the preparation of beverages.

A further object is to provide a palatable beverage which may be produced at a low cost.

While I describe herein the employment of the milk as prepared according to my invention in the preparation of beverages or drinks, this description is illustrative and not limiting, as the process of my invention and the product thereof may be employed for other purposes than strictly beverages or drinks.

The present invention in its preferred form proposes to process milk to give it among others the following advantageous properties:

1. It can be whipped by a mechanical mixer into a satisfactory air-liquid emulsion, the whipping being carried on at room temperatures.
2. The air-liquid emulsion so formed will remain stable at room temperatures for a reasonable length of time, such as will provide the necessary time for its leisurely consumption.
3. The product, that is, the drink or beverage, will have a creamy flavor, and a heavy texture superior to the present milk shakes and milk drinks.
4. Sugars, flavors, and the like may be added before or after processing or whipping without appreciably affecting its special desirable properties.

5. When whipped, the volume of the product will be increased in the neighborhood of 100% and as much as 133%.

6. The product may be easily produced by the use of machinery commonly found in the average creamery, dairy or ice cream plant.

7. The processed milk can be bottled, stored and delivered, using only regular containers and the usual method of refrigeration for milk products.

8. The dispenser can handle the product under ordinary temperatures at which normal milk is handled and use only the whipping equipment commonly employed at stands and the like.

9. The dispenser may add the usual flavors, malted milk powders, etc., without alteration of those flavors and the like, and without detriment to the final product or its ability to whip into the desired volume.

10. The processed milk or product may be frozen and kept for several days, up to a week, without detraction from the special properties of the product.

11. The ingredients employed in this process are not prohibited by the pure food laws of the United States and Canada, as they are already in use in various dairy products.

One of the drawbacks in the dairy industry in respect to specially flavored milks or dairy products, such, for example, as chocolate flavored milk, chocolate flavored yeast milk, etc., is the high percentage of returns which results in loss to the producer. The milk or product prepared in accordance with my invention may be maintained in satisfactory condition by the dispenser by maintaining it at a suitable minimum temperature so that no return of the product from the dispenser to the dairy or producer need be made. Hence this high percentage of loss of specially treated dairy products of the type above described is not encountered.

I shall now describe in detail the product, its method of processing and the theory upon which the present invention proceeds in securing the above results and advantages.

It is well known that milk is a colloidal system composed of several phases varying in their degree of dispersion. One of these consists of butter fat, calcium caseinate and possibly calcium phosphate suspended in the homogeneous phase in a fine state of dispersion.

The stability of the milk emulsion is attributed to proteins, since proteins possess the property of lowering the interfacial tension of an oil-liquid system and concentrate at these interfaces by adsorption. According to Gibbs' Equation the substance that lowers the surface tension to the greatest extent is adsorbed to the highest degree. It follows that the substance adsorbed to the surfaces presented in milk will be composed largely of those compounds which lower the surface tension in the greatest degree in the concentration in which they are present.

I have conceived that for a given butter fat content the surface area upon which the proteins may act may be increased by reducing the size of the butter fat globules. The degree of dispersion may also be increased by the same step. I then conceived that more proteins might be adsorbed if available, and this would further stabilize the system.

I found at hand a machine in common use in the processing of dairy products, namely, a homogenizer, which gives the possibility of subdividing the butter fat globules and dispersing them through the medium. This machine, commonly known as a homogenizer or viscolizer, is in common use, and it operates in the processing of dairy products by forcing the heated product, for example, milk, to be homogenized through a small aperture at high pressure. The aperture may, for example, be of the order of .001 of an inch and the pressure may be of the order of 2000 to 3000 pounds per square inch. Such treatment increases the number of globules by a very large number, such, for example, of the order of 1200 times. The increase in surface area of the butter fat globules is of the order of 117. The average size of the butter fat globules resulting from this treatment is approximately $\frac{1}{100}$ of their original size. This step of homogenizing is known, and I lay no claim to it per se. It is well known that homogenization of a dairy product greatly increases the number of butter fat globules, and consequently the surface area of the globules, giving mainly the desired effect of greater surface available for adsorption. With such greater surface available for adsorption, surrounding membranes of proteins may be formed in such manner as greatly to stabilize the fat phase. I conceive more proteins might advantageously be added because of the greater power of adsorption and the greater amount which could be adsorbed if available, and that this would further stabilize the system.

I have discovered that the addition of suitable proteins (surface tension depressants), and protective hydrophillic colloids, stabilizes the air-liquid emulsion formed on whipping and thereby raising the critical whipping temperature. Also, I have found that it was possible to incorporate a much greater amount of air in the whipping process and thereby greatly increase the volume of the product in the form in which it is dispensed and consumed.

I find that these proteins and protective hydrophillic colloids may be added before, during, or after the process of homogenization, but that maximum increase in volume and stability of the air-liquid emulsion is obtained when they are added after homogenization. I have also discovered that aging of the product over night or for a period of twelve hours at low temperature, for example, 40° F., or less, will improve the whipping properties of the product.

A specific method of processing the milk to secure the product of my invention is as follows:

It is a common requirement of municipalities that milk sold within the boundary of those municipalities must be pasteurized, and I find that this does not interfere with the practice of my process or with the desired characteristics of the product. Therefore, while I describe pasteurization of the whole milk as a step in the preparation of my product, it is to be understood that from the standpoint of securing the results of my invention, it is not essential.

Milk varies in butter fat for various reasons, usually in the neighborhood of 3% to 4½% of butter fat for the usual factory-run. Special Jersey or Guernsey runs may show as high as 5% to 8% butter fat content. The percentage of butter fat within practical limits as encountered in the usual factory-run of milk does not interfere with the process or interfere with the properties of the product. Homogenization of the milk which is a necessary step in my process, involves raising the temperature to a minimum of 90° F., but the usual temperature range is from 140° F. to 150° F. I may secure the temperature required for homogenization by cooling down the milk from the step of pasteurization, or may separately raise the temperature of the milk with or without pasteurization. The milk may be pasteurized either before or after homogenization.

The milk is homogenized by passing the same at a temperature of from 140° F. to 150° F., and at pressures from 100 to 3000 pounds per square inch through a suitable orifice of restricted size, by which it is projected at high velocity upon a solid wall to secure the desired effect of reduction of the diameter of the butter fat globules and increase in their number and degree of dispersion. Homogenization is sometimes conducted in two steps instead of a single step. That is to say, instead of passing the liquid through a single valve at a pressure of from 2000 to 3000 pounds per square inch, the liquid may be passed through two valves, the first at a pressure of approximately 2000 pounds per square inch and the second at a pressure of approximately 1000 pounds per square inch. The purpose is the same in each case. The homogenization of milk is known, and per se is not of my invention.

The next step in the preferred order of practicing my process is to add skim milk powder to the hot homogenized milk and to dissolve the powder in the milk thoroughly. The amount which is added may vary within certain limits up to 5%, by weight, of the milk being processed. I have found that more than 5% does not appreciably improve the product, and hence, while more than 5% may be employed, it is not desirable, as it merely increases the cost of the product. My experiments began with 1%, and I found that the product exhibited the desirable characteristics, but these characteristics rose rapidly as the percentage was increased up to about 5%. Thereupon addition of further amounts showed no substantially marked increase in the desired properties.

The next step in the preferred order of practicing my process is to add gelatin, and to dissolve the same thoroughly in the hot milk. The dissolving of the skim milk powder and the gelatin may be assisted by agitation through any well known means or method. The amount of gelatin which is added is of the order of ½% by weight or less. I have found that a greater amount tends to produce an undesirable tendency to gel. My best results were obtained in the addition of amounts of .25% to .3% of Grade A gelatin. Any first class gelatin which is utilized in ice cream manufacture may be employed to secure substantially the concentration indicated by the above example.

Thereafter the liquid is rapidly cooled to approximately 40° F. The liquid is then allowed to age over night at 40° F. until it is used by the dispenser. The aging is preferably done while the product is bottled, although this is not essential.

In the use of this product by the dispenser, no particular deviation from the known process of forming milk shakes and the like is required. The dispenser may add the usual malted milk powder, flavoring, sirups, extracts and the like, and subject the charge to the usual rotary agitator or reciprocating agitator to churn or whip the material into an air-liquid emulsion. For example, a six-ounce (fluid) charge of the milk as treated above had added thereto the necessary ingredients to make up the desired drink, and is then whipped or agitated to produce an air-liquid emulsion of substantially fourteen fluid ounces. The emulsion which is produced has a high degree of stability. The emulsion will stand from one to five minutes without appreciable decrease in volume, giving the consumer ample opportunity to consume the drink as leisurely as may be desired. While in the description of a specific practice of the process, I have referred to the two ingredients as skim milk powder and gelatin, it is to be understood that equivalents of the same may be employed.

The skim milk powder which I have referred to constitutes a suitable source of proteins and within my invention other materials serving as a suitable source of proteins may be employed as a substitute therefor in whole or in part. Other sources of proteins suitable for this purpose are whole milk powder, alkaline skim milk powder, or alkaline whole milk powder.

I have referred above to the addition of gelatin. The service which gelatine performs in this connection is that of a colloid protecting the emulsion against destruction by the action of heat. A variety of hydrophillic colloids is available. Protective colloids, such as gelatine, agar-agar, sodium alginate, gum tragacanth, gum arabic, albumin, globulin, and the like may be employed for this purpose.

I conceive that it may be possible to employ a material or materials having a more or less pronounced surface tension depressant effect and a more or less pronounced effect as a protective colloid, and I do not intend therefore to be limited to employing the above materials within the ranges above indicated, as conceivably different ingredients or different proportions of various ingredients may be employed.

The skim milk powder or its equivalents assist in the formation of the air-liquid emulsion by the surface tension depressant effect above mentioned, and the gelatin or its equivalents tend to stabilize the emulsion by the protective effect above mentioned.

By my invention, the milk or product resulting from the practice of the above treatment has greatly enhanced whipping properties. It may be whipped at temperatures well above the critical whipping temperature of normal milk, and within a practical temperature range such as is encountered at the average store counter. The resultant air-liquid emulsion, upon being produced by whipping in a mechanical mixer, has a high degree of stability as aforesaid.

I do not intend to be limited to the precise details of the process and ingredients or range of ingredients above recited, as those skilled in the art will at once appreciate that deviation is possible without departing from the spirit of my invention.

While I have described the addition of the skim milk powder, and the subsequent addition of the gelatin as separate operations, it is to be understood that these two ingredients may be added and dissolved simultaneously and that the two ingredients may be prepared in advance in certain proportions as an admix to the milk in certain proportions.

Where the stability factor is not of primary importance the addition of gelatine may be omitted or reduced. In practice however, I have found it to be highly desirable.

The cooling of the prepared milk to 40° F., as above described, brings the material under the critical whipping temperature.

I claim:

1. Method of raising the foaming temperature of milk to approximately 40° F. which comprises homogenizing the milk and dissolving in the milk from 1% to approximately 5% milk powder.

2. Method of processing milk to permit the same to be whipped into a fairly stable air-liquid emulsion at approximately 40° F. which consists in homogenizing the milk and dissolving in the milk from 1% to approximately 5% milk powder and approximately ¼% to ½% gelatin.

3. Method of raising the foaming temperature of milk to approximately 40° F. which comprises homogenizing the milk and dissolving in the milk while it is hot a material containing a surface tension depressant protein selected from the class of skim milk powder, whole milk powder, alkaline skim milk powder and alkaline whole milk powder in amount of 1% to approximately 5%.

4. Method of processing milk to permit the same to be whipped into a fairly stable air-liquid emulsion which comprises homogenizing the milk, dissolving in the milk while hot a material containing a surface tension depressant protein selected from the class of skim milk powder, whole milk powder, alkaline skim milk powder, and alkaline whole milk powder in an amount of 1% to approximately 5% and a material providing a protective colloid selected from the class of gelatine, agar-agar, alubumin, globulin, sodium alginate, gum tragacanth and gum arabic in substantially dry form in an amount of approximately ¼% to ½%.

5. An admix to milk which is homogenized to render it capable of being whipped while at a temperature of approximately 40° F. into an air-liquid emulsion with an increase in volume of 100% to 133% and suitable stability for fountain service comprising a mixture of milk powder and gelatine in powder form in substantially the ratio of from 10 to 50 parts milk powder to 2.5 to 5 parts of gelatine powder.

6. An admix to milk which is homogenized to render it capable of being whipped while at a temperature of approximately 40° F. into an air-liquid emulsion with an increase in volume of 100% to 133% and suitable stability for fountain service comprising a mixture of a material in powder form containing a surface tension depressant protein selected from the class of skim milk powder, whole milk powder, alkaline skim milk powder, alkaline whole milk powder and a material in powder form selected from the class of gelatine, agar-agar, albumin, globulin, sodium alginate, gum tragacanth, and gum arabic, in substantially the ratio of from 10 to 50 parts of the first said material to from 2.5 to 5 parts of the second material.

7. A whipping milk capable of whipping at approximately 40° F. into an air-liquid emulsion with an overrun of approximately 100% to 133% consisting essentially of homogenized milk having dissolved therein milk powder in the amount of 1% to approximately 5%.

8. A whipping milk capable of whipping at approximately 40° F. into a fairly stable air-liquid emulsion with an overrun of approximately 100% to 133% consisting essentially of homogenized milk having dissolved therein milk powder in the amount of 1% to approximately 5% and gelatine in the amount of approximately ¼% to ½%.

9. A whipping milk capable of whipping at approximately 40° F. into a fairly stable air-liquid emulsion with an overrun of approximately 100% to 133% consisting essentially of homogenized milk having dissolved therein a material comprising a surface tension depressant protein selected from the class of skim milk powder, whole milk powder, alkaline skim milk powder and alkaline whole milk powder in an amount of 1% to approximately 5%, and a material providing a protective colloid selected from the class of gelatine, agar-agar, alubumin, globulin, sodium alginate, gum tragacanth and gum arabic in an amount of approximately ¼% to ½%.

HERBERT STANLEY SAMSON.